Sept. 4, 1934.  W. SALCHOW  1,972,574
APPARATUS FOR PHOTOGRAPHING COPY
Filed Oct. 17, 1931    5 Sheets-Sheet 1

Inventor:
Willy Salchow
by Karl Michaelis
Atty.

Inventor:
Willy Salchow

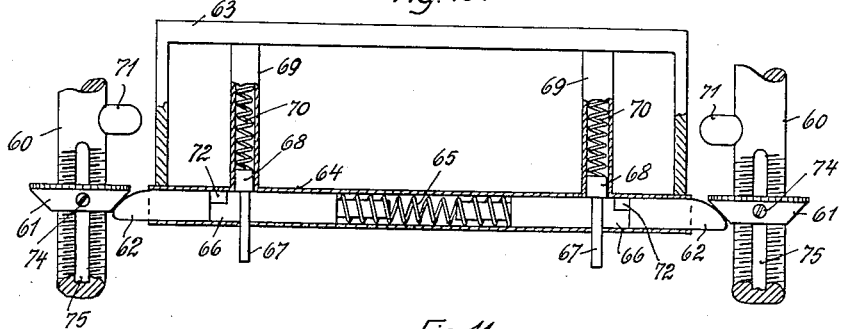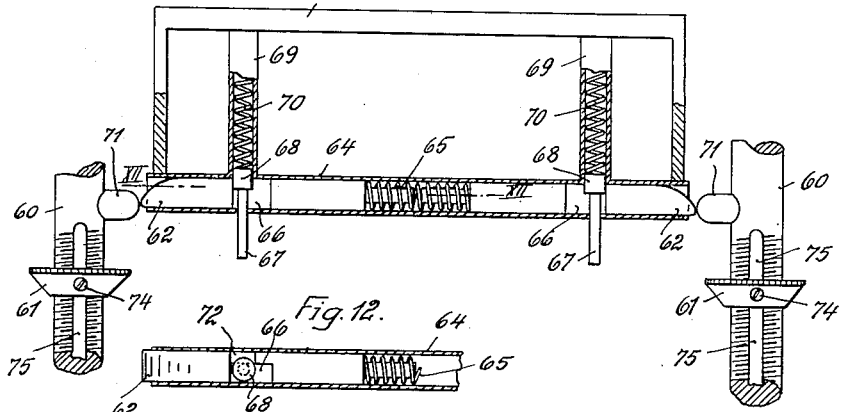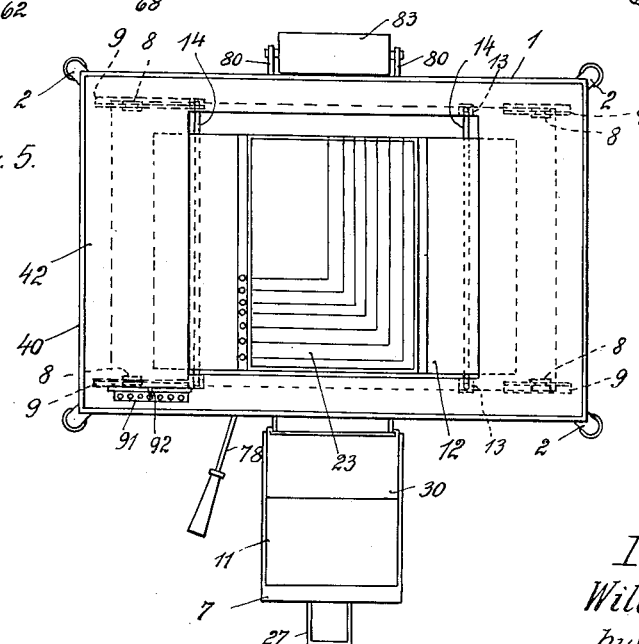

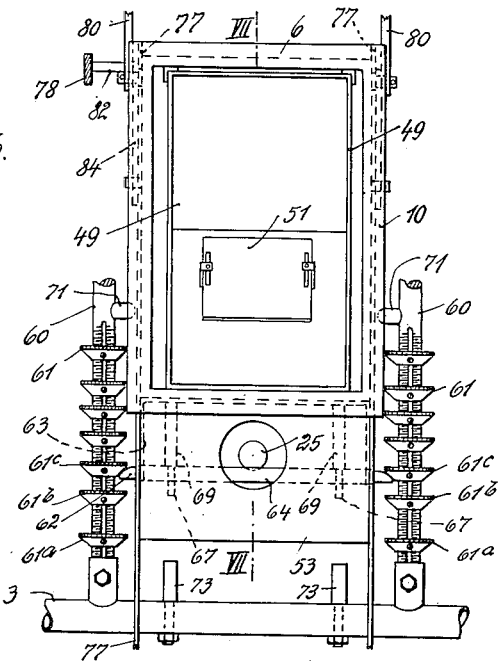
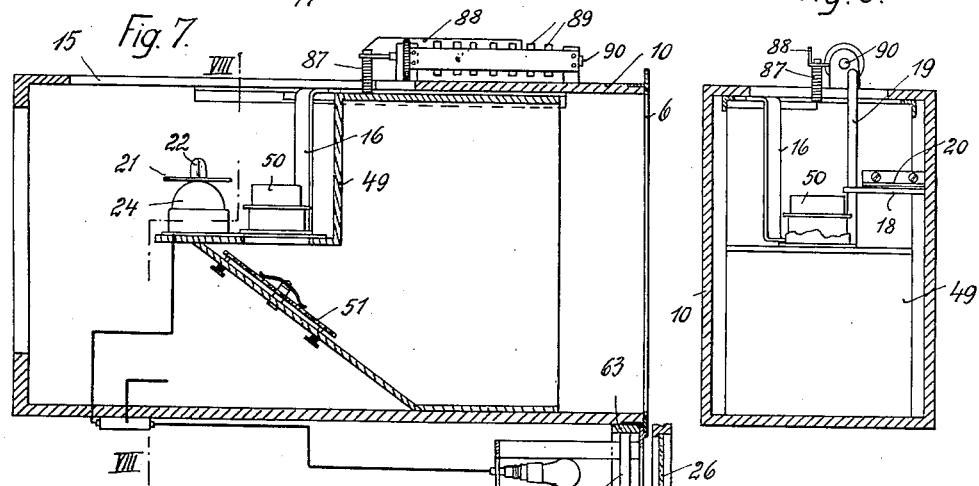
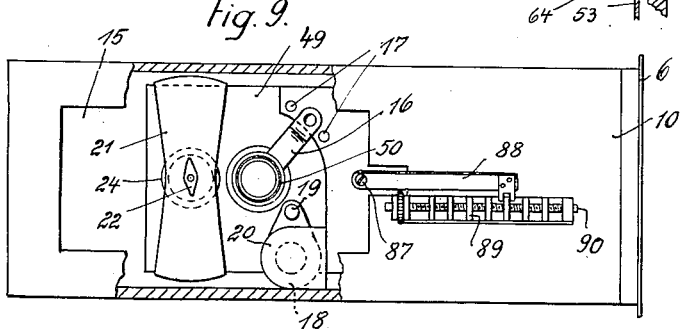

Patented Sept. 4, 1934

1,972,574

UNITED STATES PATENT OFFICE 1,972,574

APPARATUS FOR PHOTOGRAPHING COPY

Willy Salchow, Berlin-Tempelhof, Germany

Application October 17, 1931, Serial No. 569,431
In Germany May 19, 1928

9 Claims. (Cl. 88—24)

My invention relates to apparatus for photographing what is known as "copy", i. e. letters, documents, maps, book pages and the like.

It is an object of my invention to provide a particularly simple and handy apparatus of this type.

To this end I design the apparatus in a particularly convenient form, i. e. like a writing desk or table, in which the camera is mounted to reciprocate vertically in combination with a horizontally movable top plate supporting the copy holder, and I provide means such as marks, indicators, scales or the like, for indicating the relative position of the camera and the top plate.

In the drawings affixed to the specification and forming part thereof a photographic apparatus embodying my invention is illustrated diagrammatically by way of example.

In the drawings

Fig. 5 is a plan view of the apparatus,

Fig. 6 is a partial front end elevation, drawn to a larger scale,

Fig. 7 is a section on the line VII—VII in Fig. 6,

Fig. 8 is a section on the line VIII—VIII in Fig. 7,

Fig. 9 is a plan view of Fig. 7, partly broken open,

Fig. 10 is a partly sectional elevation of a latch or ratchet mechanism for cooperation with the parts illustrated in Fig. 6, drawn to a larger scale and showing the latches released, Fig. 11 shows the same parts, with the latches locked, Fig. 12 is a section on the line XII—XII in Fig. 11.

Figure 1:
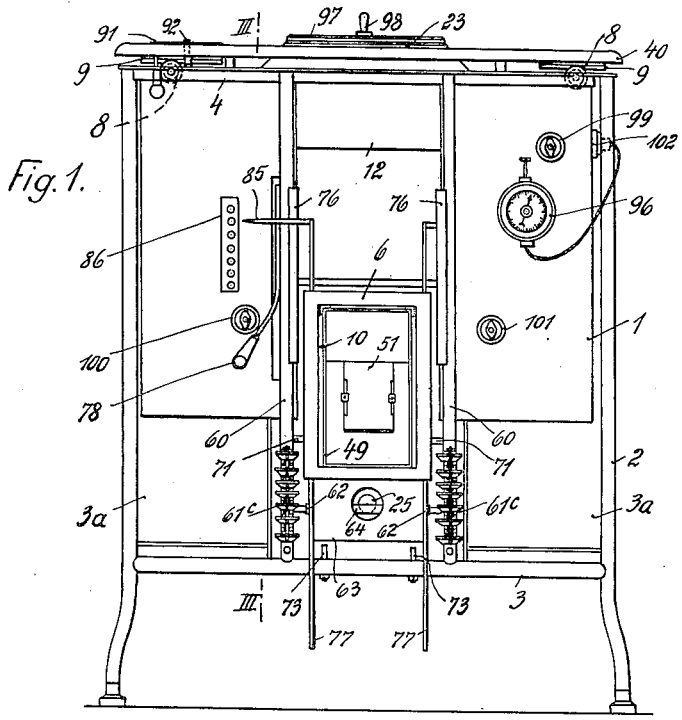
Fig. 1 is a front end elevation of the apparatus, as the operator sees it.

Referring now to the drawings, 1 is the rectangular casing of the apparatus, and 2 is a metal frame having four uprights and suitable braces 3. Shelves 3a, Fig. 2, may be provided for the reception of copy. The upper end of the casing 1 is attached to the frame 2 by any suitable means, for instance, angle sections 4 at the upper end of the casing, Figs. 2 and 3. 10 is the camera, to which a dark slide 11 and a collector 7, Fig. 3, for the exposed sheets are connected at its front end. These units form no part of the present invention and therefore will not be described. 6 is a frame at the front end of the camera 10 to which the dark slide 11 is attached by any suitable means, for instance, strips or hooks 105a, Fig. 4, at its open rear face. 30 is a mirror on top of the dark slide 11, the purpose of which will be explained below. 12 is the copy holder which is inserted in an opening of the top plate 40 of the apparatus and spaced therefrom at three sides, as best seen in Fig. 5. 23 is a glass plate at the upper end of the copy holder for the reception of copy. As will appear from Figs. 1 and 2, the upper end of the copy holder 12 projects slightly above the face of the top plate 40, so that the top plate will not interfere with maps or other large pieces which extend beyond the sides of the glass plate 23. 42 is a liner of linoleum or other suitable material with which the upper face of the top plate may be laid like a table. The apparatus is so high that the top plate is presented to the operator in a convenient position, like the top of a table or writing desk.

8 are rollers which are mounted to rotate on suitable pins at the upper end of the frame 2, and 9 are angle sections which are attached to the lower face of the top plate 40 with their vertical flanges serving as tracks for the rollers 8, and 13 are brackets extending downwardly from the top plate 40 at the sides of its opening. 14 are transverse rods connecting the lower ends of two opposite brackets 13 for supporting the copy holder 12.

Figure 3:
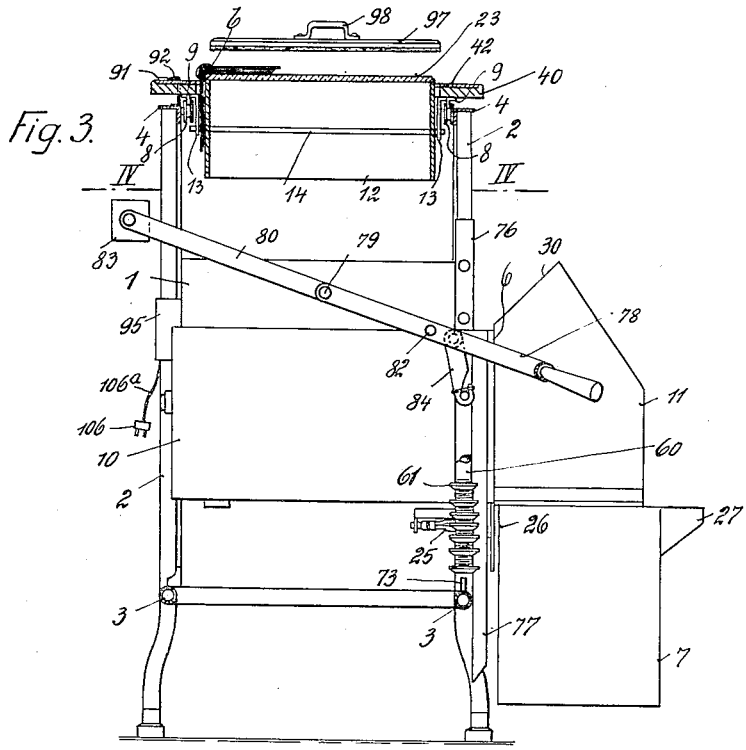
Fig. 3 is a section on the line III—III in Fig. 1.

In the example illustrated a clearance for books in the position indicated at b in Fig. 3 is provided between the opening in the top plate 40, one of the vertical, and two of the sloping faces of the copy holder 12, but obviously the copy holder, if desired, might be so arranged as to provide a clearance at its other vertical faces as well.

The camera 10 is equipped with a sliding frame or objective holder 49, with the objective 50, Fig. 7, in vertical position and a mirror 51 arranged below the objective at an angle of 45° for deflecting the image of the copy on the glass plate 23 horizontally into the opening of the dark slide 11. It is preferred to equip the camera with a sliding objective frame instead of the usual bellows which are delicate and favour the accumulation of dust. 15 is an opening in the upper face of the camera through which the objective 50 and its accessories are accessible from above. The objective 50 is equipped with the usual diaphragms, not shown, and a handle 16 for adjusting the diaphragms. The handle may be fixed in the positions corresponding to the normal operation of the apparatus by means of pins or holes 17, Fig. 9. In the present instance, three positions are provided, for three diaphragm openings, but the handle may be moved beyond the position corresponding to the smaller openings for certain operations. 18 is an isochromatic screen which is pivoted at 19 so as to be placed alternately in line with the objective and to be moved into the inactive position illustrated in which it is concealed by a screen 20. 21 is a shutter or dust blind for the objective which is provided with a handle 22 for rotating it. The handle 22 is connected to a switch 24 in the circuit of a lamp 25, which serves for ascertaining the regular operation of the feeding means (not shown) in the dark slide 11 in the following manner: 26 is a pane of ruby glass or other inactinic material which is inserted in a hole in the rear wall of the collector 7. A corresponding hole (not shown) is made in the front wall of the collector 7 opposite a sloping mirror (not shown) in a frame 27, Fig. 3, at the front wall of the collector. It will appear that in this manner the image of the lamp 25 is reflected by the mirror in frame 27 and observed by the operator. The hole with the ruby pane 26 is so arranged that the sheets which are fed from the dark slide and severed at its bottom, in falling into the collector 7 alternately expose and obstruct the ruby pane 26 and the image of the lamp 25 alternately appears and disappears in the normal operation of the feed. If the image appears permanently this indicates that the paper is not fed properly or that the supply has become exhausted, while if it disappears permanently, this indicates that the collector is filled as the last sheet which has been severed cannot move down and permanently obstructs the opening 26.

Means are provided for varying the focussing distance, i. e. the position of the camera 10 with respect to the glass plate 23 of the copy holder, as required for the various sizes of copy to be photographed. Such means include two parallel vertical threaded rods 60 which extend upwardly from the front transverse brace 3, Figs. 10 to 12, adjustable checks 61 on the two rods 60, and a pair of spring latches 62 which project on opposite sides of a frame 63 at the bottom of the camera 10, 64 is a tubular guide of square section in which the latches 62 are mounted to slide, and 65 is a spring which is inserted between the latches and tends to force them out of the frame 63. The upper edges of the latches 62 are inclined for cooperation with the sloping or tapered sides of the checks 61, and their lower edges are straight and bear on the flat upper faces of the checks. 66 are recesses in the latches 62 in which engage spring-controlled rods 67 in the lower ends of pistons 68 in cylinders 69 secured in the frame 63. 70 are springs tending to force the pistons 60 out of their cylinders 69. When the latches 62 are at the outer ends of their stroke as shown in Fig. 10, the inner faces of their recesses 66 engage the piston rods 67 and arrest the latches. 71 are dogs above the sets of checks 61 on each rod 60, by which, as shown in Fig. 11, the latches 62 are pushed back into the guide 64 against the action of spring 65. When the latches are in this position the pistons 68 engage in extensions 72 of the recesses 66, as shown in Fig. 12, and lock the latches in their retracted position. In this position they are free to move with the camera 10 without being interfered with by the checks 61 until the lower ends of piston rods 67 engage abutments 73 on the brace 3, Fig. 6, which push the pistons 68 back into their cylinders 69 and release the latches 62, permitting spring 65 to return them into their active position with respect to the checks 61, as shown in Fig. 10. Each pair of checks 61 corresponds to a given position of the camera 10 and its objective 50 with respect to the glass plate 23 of the copy holder 12. The several checks 61 are marked so as to be readily distinguished, for instance, painted in various colours. They are adjusted by turning them on the threaded portions of the rods 60, and held in position by screws 74 engaging in grooves 75 of the rods 60.

The camera is weighted at its front end by the comparatively heavy dark slide 11 and collector 7, 76, Figs. 1 and 3, are semi-circular slides at the sides of the camera 10 which move on the unthreaded upper portions of rods 60 and guide the camera vertically. 77 are parallel supports which extend downwardly from the front end of frame 63 and engage the front brace 3 with their rear edges. These supports counteract the tendency of the camera and dark slide unit to sag toward the right in Fig. 3 under the weight at the front end of the camera.

Figure 4:
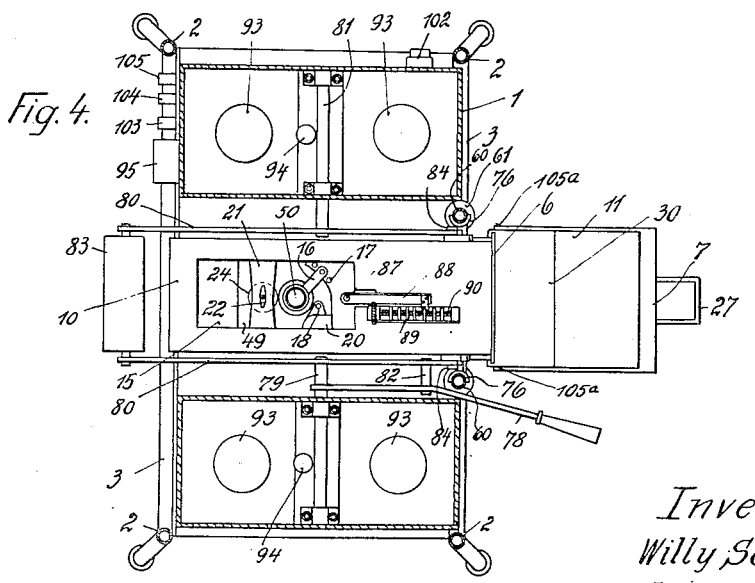
Fig. 4 is a section on the line IV—IV in Fig. 3.

78 is a lever on a shaft 79 which is mounted to rock in the casing 1, Fig. 4. 80 is a horseshoe frame surrounding the camera and mounted to rock on the shaft 79 of lever 78 and another shaft 81 which is arranged on the opposite side of the camera in line with shaft 79. 82 is a stay by which the lever 78 is connected to the frame 80, 83 is a balance weight at the rear end of the frame 80, and 84 are links at the front end of the frame by which it is connected to the camera. The weight 83 is so determined that it only balances the major portion of the weight suspended at the links 84, so that the operator's work is facilitated but still the camera unit tends to move down by gravity.

When it is desired to raise the camera 10 into a given position, the operator moves upwards the lever 78. The latches 62 recede while the camera is being raised as their sloping upper edges are pushed inwardly by the sloping sides of checks 21 and engage above the flat upper faces of the checks 61 with their straight lower edges, like the pawls of a ratchet wheel. When the camera has been raised to the desired position which is indicated by an indicator 85 at the camera, Fig. 1, and a scale 86 at the front wall of the casing 1, the handle 78 is released, whereupon the latches 62 bear on the flat upper faces of the corresponding pair of checks 61.

In the example illustrated, Figs. 1 and 6, the camera has been raised until its latches 62 engage below the third pair of dogs 61c from below, and it is intended that the camera should be supported by the next higher pair of checks 61b. A corresponding mark, for instance a line having the same colour as the two checks 61b is then attained by the indicator 85 on the scale 86.

When it is desired to lower the camera, for instance from the pair of checks 61b to the lowest pair 61a, the latches 62 must first be retracted. This in effected by raising the camera beyond the dogs 71, which as shown in Fig. 11 push back the latches 62 so that they are clear of the checks 61, and locked by the pistons 68 and the extensions 72. The camera, with its latches retracted, is now lowered until the piston rods 67 are pushed back by the abutments 73 on the brace 3, releasing the latches 62 and permitting them to cooperate with the checks 61 in the manner described.

Obviously it is necessary to adjust the objective frame 49 in the camera 10 in conformity with the vertical position of the camera. Such means include a pivot 87, Figs. 8 and 9, on the top of the frame 49, with a hook 88 pivoted thereon, and a set of checks 89 on a threaded spindle 90 which correspond to the pairs of checks 61 on the rods 60, for instance by their colour.

The areas on the glass plate 23, Fig. 5, corresponding to the several positions of the camera with respect to the glass plate 23 are marked with the corresponding colours.

It will be understood that the operation of the camera is extremely simple and, though not automatic, practically foolproof, so that any unskilled operator can handle it. All that the operator has to attend to is raising or lowering the camera until the indicator 85 is opposite the line on the scale 86 which has the colour of the field on the glass plate 23 on which the copy, for instance the book b, Fig. 3, has been placed, to shift the objective frame 49 until the hook 88 is opposite the corresponding check 89 on the spindle 90, to throw in the hook 88, and to move the top plate 40 to bring the field on which the copy b is supported, in line with the objective. The proper position of the top plate is read by a scale 91 on the top plate 40 and an indicator 92 on the casing 1, Figs. 1 and 5.

The illuminating system of the apparatus includes the lamp 25 which has already been described, for indicating the proper function of the apparatus at the mirror in the frame 27 of the collector 7, four principal lamps 93 in the casing and two auxiliary lamps 94 for positioning the copy on the plate 23 before cutting in the principal lamps 93. The position of the copy on the glass plate 23 is inspected at the light of lamps 94 by means of a mirror 30 on the upper portion of the dark slide 11. The illuminating system is controlled by the switch 24, Figs. 7 and 9, a relay 95, Fig. 4, and a time switch 96, Fig. 1, which is connected to a plug contact 102 by a cable, and a set of switches on the casing 1 which will be described with reference to the diagram of connections in Fig. 13. The switch 24 is connected to the shutter or dust blind 21, Fig. 9, in such manner that the objective 50 is protected by the shutter if the current is cut out. Fig. 9 shows the objective exposed. The shutter in moving into line with the objective, also pushes aside the isochromatic screen 18, so that it will not be left on the objective by mistake. When the operator has set the lever 16 of the objective 50 for a diaphragm opening which is outside the range of the three openings for normal operation, the lever 16 is in the way of the shutter and the operator cannot move the shutter into closing position and cut out the circuit without resetting the lever 16 for the opening of normal operation, so that it will not happen that the camera is operated with an unsuitable diaphragm opening.

Figure 2:
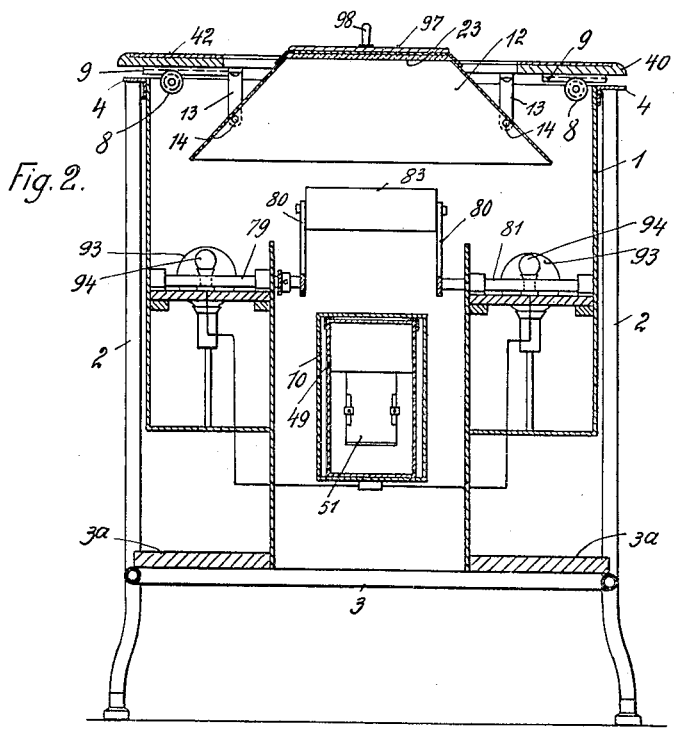
Fig. 2 is a sectional elevation of the apparatus.

97, Figs. 1-3, is a plate resembling a letter weight, with a handle 98, which is placed on the copy so as to hold it in position on the glass plate 23. Obviously the plate 97 is not applied for thick copy in a one-sided position, such as the book b in Fig. 3. The lower face of the plate 97 is roughened or lined with a layer of some rough material, for instance velvet or the like, which adheres firmly to the back of the copy but does not bind on the glass plate 23, while the friction at the lower face of the copy is small on the glass plate 23. The plate facilitates the adjusting of the copy to the marked fields on the glass plates 23, Fig. 5.

Figure 13:
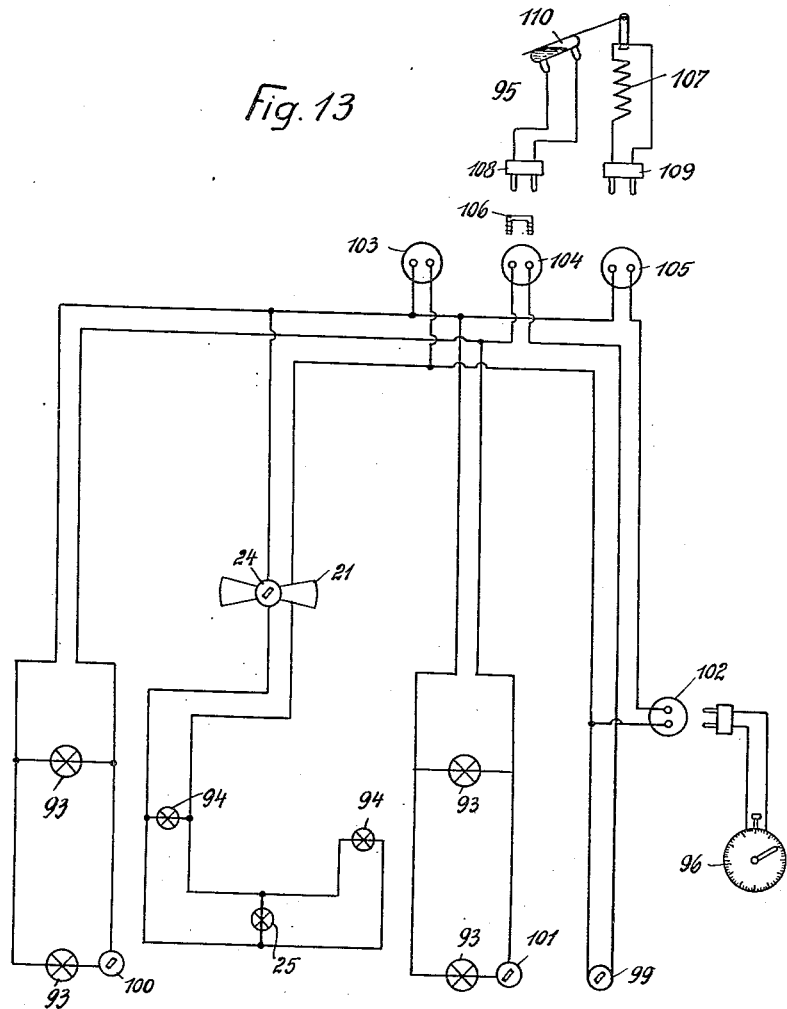
Fig. 13 is a diagram of connections for the illuminating system of the apparatus.

Referring now to Fig. 13, 103 is a plug or other contact by which the circuits of the apparatus are connected to a system, not shown. The contact 103 supplies the principal lamps 93. Switches 100 and 101 are provided in the circuits of these lamps for cutting out two of them, if desired. The lamp circuits are connected to a short-circuiting contact 104 which in turn is connected to a switch 99. To this switch one wire of the circuit for the auxiliary lamp 94 and the inspection lamp 25 is connected. The circuit also includes the switch 24 on the shutter or dust blind 21 for the objective 50. The circuit of the principal lamps 93 is furthermore connected to a relay contact 105 from which a wire extends to the contact 102 for the time switch 96. The other terminal of the contact 102 is connected to the switch 99. Under normal conditions the relay 95 which is equipped with a magnet 107 and a tilting mercury tube 110 and is connected to the contacts 104 and 105 by contacts 108 and 109, operates the circuits under the control of time switch 96. Current flows from contact 103 through the circuits of the principal lamps 93 and also through the circuits of the auxiliary lamps 94 and the inspection lamp 25. The circuits are controlled by the switches 100, 101, 24, 99 and the time switch 96. The magnet 107 in the relay 95 is excited by the time switch and attracts its armature, throwing over the tube 110, so that the circuits are completed at contact 104, and are cut out automatically by the time switch 96, or manually by the other switches.

If the relay 95 is damaged the system is short-circuited by the bridge 106, which as shown in Fig. 3, is suspended from the casing 1 by a chain or the like 106a, the length of which is so determined that the bridge can be connected only to the contact 104 and not, by mistake, to the contact 103 or the contact 105.

The shutter or dust blind 21 is so arranged with respect to its switch 24 that the circuit of the auxiliary lamps 94 is interrupted when the shutter is above the objective 50 so that the operator cannot leave the shutter in the position in which the objective is concealed as if he does so he cannot light the lamps 94 and is reminded of his oversight. In apparatus in which this precaution is not taken it may happen that the apparatus is started with the shutter above the objective.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. An apparatus for photographing copy comprising a frame having the general form of a writing desk or table, a camera mounted to reciprocate vertically in said frame, a top plate mounted to reciprocate horizontally on said frame, a copy holder on said top plate, means for indicating the relative position of said camera and said top plate, means for reciprocating said camera, adjustable checks for fixing it in several positions, means on said camera for supporting it on said checks, automatic means for controlling said supporting means as to their position with respect to said checks, an objective frame in said camera, and marks on said frame, said camera and said top plate for adjusting the objective frame and the top plate in conformity with the position of the camera on said frame.

2. An apparatus for photographing copy comprising a frame having the general form of a writing desk or table, a camera mounted to reciprocate vertically in said frame, a top plate mounted to reciprocate horizontally on said frame, a copy holder on said top plate, means for indicating the relative position of said camera and said top plate, means for reciprocating said camera, adjustable checks for fixing it in several positions, means on said camera for supporting it on said checks, including a pair of latches extending from the sides of said camera and adapted to engage said checks, a spring tending to force said latches apart and into active position with respect to said checks, sloping sides on said checks and corresponding faces on the ends of said latches adapted to cooperate for moving said latches back into said camera, flat top faces on said checks, straight faces on said latches for engaging said top faces, automatic means for controlling said latches as to their position with respect to said checks, an objective frame in said camera, and marks on said frame, said camera and said top plate for adjusting the objective frame and the top plate in conformity with the position of the camera on said frame.

3. An apparatus for photographing copy comprising a frame having the general form of a writing desk or table, a camera mounted to reciprocate vertically in said frame, a top plate mounted to reciprocate horizontally on said frame, a copy holder on said top plate, means for indicating the relative position of said camera and said top plate, means for reciprocating said camera, adjustable checks for fixing it in several positions, means on said camera for supporting it on said checks, including a pair of latches extending from the sides of said camera and adapted to engage said checks, a spring tending to force said latches apart and into active position with respect to said checks, sloping sides on said checks and corresponding faces on the ends of said latches adapted to cooperate for moving said latches back into said camera, flat top faces on said checks, straight faces on said latches for engaging said top faces, a fixed dog above said checks for moving said latches into inactive position with respect to them, automatic means for holding said latches in their inactive position, a fixed abutment below said checks, means adapted to be controlled by said abutment for throwing out said locking means, an objective frame in said camera, and marks on said frame, said camera and said top plate for adjusting the objective frame and the top plate in conformity with the position of the camera on said frame.

4. An apparatus for photographing copy comprising a frame having the general form of a writing desk or table, a camera mounted to reciprocate vertically in said frame, a top plate mounted to reciprocate horizontally on said frame, a copy holder on said top plate, means for indicating the relative position of said camera and said top plate, means for reciprocating said camera, means for partly balancing the weight of said camera, adjustable checks for fixing it in several positions, means on said camera for supporting it on said checks, automatic means for controlling said supporting means as to their position with respect to said checks, an objective frame in said camera, and marks on said frame, said camera and said top plate for adjusting the objective frame and the top plate in conformity with the position of the camera on said frame.

5. An apparatus for photographing copy comprising a frame having the general form of a writing desk or table, a camera mounted to reciprocate vertically in said frame, an objective in said camera, a dust blind for said objective, an isochromatic screen for said objective which is so arranged as to interfere with the dust blind upon its return into the position in which it conceals the objective, a top plate mounted to reciprocate horizontally on said frame, a copy holder on said top plate and means for indicating the relative position of said camera and said top plate.

6. An apparatus for photographing copy comprising a frame having the general form of a writing desk or table, a camera mounted to reciprocate vertically in said frame, a top plate mounted to reciprocate horizontally on said frame, a copy holder on said top plate, means for indicating the relative position of said camera and said top plate, and a plate having a rough underside adapted to be placed on the copy on said holder for displacing the copy.

7. An apparatus for photographing copy comprising a frame, a camera in said frame, an objective in said camera, a dust blind for said objective, an isochromatic screen for said objective which is so arranged as to interfere with the dust blind upon its return into the position in which it conceals the objective, a copy holder on said frame and means for indicating the relative position of said camera and said copy holder.

8. An apparatus for photographing copy comprising a frame having the general form of a writing desk or table, a camera mounted to reciprocate vertically in said frame, an objective in said camera, a dust blind for said objective, a diaphragm-setting arm which is so arranged as to interfere with the dust blind upon its return into the position in which it conceals the objective, a top plate mounted to reciprocate horizontally on said frame, a copy holder on said top plate and means for indicating the relative position of said camera and said top plate.

9. An apparatus for photographing copy comprising a frame, a camera in said frame, an objective in said camera, a dust blind for said objective, a diaphragm-setting arm which is so arranged as to interfere with the dust blind upon its return into the position in which it conceals the objective, a copy holder on said frame and means for indicating the relative position of said camera and said copy holder.

WILLY SALCHOW.